United States Patent
Song et al.

(10) Patent No.: US 11,039,461 B2
(45) Date of Patent: *Jun. 15, 2021

(54) METHOD AND DEVICE OF RESOURCE ALLOCATIONS FOR SCHEDULING ASSIGNMENTS IN DEVICE TO DEVICE COMMUNICATIONS

(71) Applicant: Telefonaktiebolaget L M Ericsson (publ), Stockholm (SE)

(72) Inventors: Xinghua Song, Beijing (CN); Shaohua Li, Beijing (CN); Qianxi Lu, Beijing (CN); Stefano Sorrentino, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/949,583

(22) Filed: Apr. 10, 2018

(65) Prior Publication Data
US 2018/0242346 A1   Aug. 23, 2018

Related U.S. Application Data

(63) Continuation of application No. 14/893,308, filed as application No. PCT/CN2015/090142 on Sep. 21, 2015, now Pat. No. 9,999,066.

(30) Foreign Application Priority Data

Sep. 26, 2014  (WO) ............... PCT/CN2014/087601

(51) Int. Cl.
*H04W 72/12* (2009.01)
*H04W 72/02* (2009.01)

(52) U.S. Cl.
CPC ... *H04W 72/1263* (2013.01); *H04W 72/1257* (2013.01); *H04W 72/02* (2013.01); *H04W 72/1289* (2013.01)

(58) Field of Classification Search
CPC .................... H04W 72/1263; H04W 72/1257
See application file for complete search history.

(56) References Cited

U.S. PATENT DOCUMENTS

| 2013/0089010 A1 | 4/2013 | Richardson et al. |
| 2015/0085818 A1* | 3/2015 | Huang ............... H04L 5/0037 370/330 |

(Continued)

FOREIGN PATENT DOCUMENTS

| CN | 103999536 A | 8/2014 |
| CN | 104704888 A | 6/2015 |

(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 10)", 3GPP TS 36.212 V10.0.0, Dec. 2010, pp. 1-72.

(Continued)

*Primary Examiner* — Nathan A Mitchell
(74) *Attorney, Agent, or Firm* — Murphy, Bilak & Homiller, PLLC

(57) ABSTRACT

Methods and devices for scheduling assignment resource patterns determining are provided. Mappings of scheduling assignment resource patterns to scheduling assignment resource pool in a device 5 to device, D2D, communication network are given. The way to notify a D2D device of the resource pattern for using is also given.

12 Claims, 9 Drawing Sheets

(56) References Cited

U.S. PATENT DOCUMENTS

| | | | |
|---|---|---|---|
| 2015/0264733 A1* | 9/2015 | Guo | H04W 48/06 370/329 |
| 2015/0271807 A1* | 9/2015 | Patil | H04W 72/1215 455/426.1 |
| 2015/0271840 A1* | 9/2015 | Tavildar | H04L 1/08 370/329 |
| 2015/0327180 A1* | 11/2015 | Ryu | H04L 1/00 370/329 |
| 2015/0334698 A1* | 11/2015 | Park | H04W 4/70 455/426.1 |
| 2015/0358946 A1* | 12/2015 | Wang | H04L 5/0053 370/329 |
| 2015/0382324 A1* | 12/2015 | Sheng | H04W 72/02 370/329 |
| 2016/0014589 A1* | 1/2016 | Niu | H04W 40/244 370/329 |
| 2016/0037512 A1* | 2/2016 | Lei | H04W 56/003 370/336 |
| 2016/0044665 A1* | 2/2016 | Novlan | H04W 76/14 370/336 |
| 2016/0044729 A1* | 2/2016 | Tu | H04W 74/04 370/329 |
| 2016/0183276 A1* | 6/2016 | Marinier | H04W 72/02 370/329 |
| 2016/0219634 A1* | 7/2016 | Lu | H04W 72/0406 |
| 2017/0048908 A1* | 2/2017 | Matsumoto | H04W 76/14 |
| 2017/0055265 A1* | 2/2017 | Wei | H04W 72/0453 |
| 2017/0064734 A1* | 3/2017 | Tsuboi | H04W 72/1268 |
| 2017/0142692 A1* | 5/2017 | Kim | H04W 72/042 |
| 2017/0164381 A1* | 6/2017 | Kim | H04W 72/12 |
| 2018/0035410 A1* | 2/2018 | Panteleev | H04W 72/042 |

FOREIGN PATENT DOCUMENTS

| | | |
|---|---|---|
| EP | 2747490 A1 | 6/2014 |
| WO | 2015142429 A1 | 9/2015 |

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP TS 36.213 V10.0.0, Dec. 2010, pp. 1-98.

"D2D Resource Pool and Scheduling Assignments", 3GPP TSG-RAN WG1 Meeting #76bis, R1-141571, Shenzhen, China, Mar. 31-Apr. 4, 2014, pp. 1-5.

"ENB Controlled Resource Allocation for D2D Communication", 3GPP TSG RAN WG1 Meeting #77, R1-142017, Seoul, Korea, May 19-23, 2014, pp. 1-6.

"Patterns for scheduling assignments", 3GPP TSG-RAN WG1 Meeting #78, R1-143247, Dresden, Germany, Aug. 18-22, 2014, pp. 1-4.

"D2D Physical Channels Design", Ericsson, 3GPP TSG RAN WG1 Meeting #76, R1-140776, Prague, Czech Republic, Feb. 10-14, 2016, pp. 1-9.

"On scheduling procedure for D2D", Ericsson, 3GPP TSG-RAN WG1 Meeting #76, Prague, Czech Republic, R1-140778, Feb. 10-14, 2014, pp. 1-5.

"Overview of D2D functions and standardization impact", Ericsson, 3GPP TSG RAN WG1 Meeting #76, R1-140771, Prague, Czech Republic, Feb. 10-14, 2014, pp. 1-7.

"Frame Structure for D2D-Enabled LTE Carriers and Resources Configuration", 3GPP TSG-RAN WG1 Meeting #78; R1-143367; Dresden, Germany, Aug. 18-22, 2014, pp. 1-8.

* cited by examiner (a) Scenario 1A (b) Scenario 1B (c) Scenario 1C (d) Scenario 1D

METHOD AND DEVICE OF RESOURCE ALLOCATIONS FOR SCHEDULING ASSIGNMENTS IN DEVICE TO DEVICE COMMUNICATIONS

CROSS-REFERENCE TO RELATED APPLICATION(S)

This application is a continuation of, and claims the benefit of priority from, U.S. patent application Ser. No. 14/893,308 filed on Nov. 23, 2015, which is a U.S. national-stage application claiming priority to international application PCT/CN2015/090142 filed on Sep. 21, 2015, which claims priority to PCT/CN2014/087601 filed on Sep. 26, 2014. The entire disclosures of the above-mentioned applications are incorporated herein by reference for all purposes.

TECHNICAL FIELD

The present disclosure relates to telecommunications, particularly to a device and method of resource allocations for scheduling assignments in device to device (D2D) communications.

BACKGROUND

Proximity-based applications and services represent an emerging social-technological trend. In 3GPP (the 3rd Generation Partner Project), a Proximity Services (ProSe) capability in LTE is introduced in Release-12. It is also aka D2D communications. It would allow the 3GPP industry to serve this developing market, and will, at the same time, serve the urgent needs of several Public Safety communities that are jointly committed to LTE (Long Term Evolution). ProSe normative specification is also important to enable economy of scale advantages, i.e. that the resulting system can be used for both Public Safety and non-Public-Safety services, where possible. In Release-12, two kinds of service are provided, one is D2D discovery and one is D2D communications. The details are given below.

D2D Discovery

FIG. 1 shows scenarios for D2D ProSe where User Equipment, UE1 and UE2 are located in-coverage/out-of-coverage of a cell. When UE1 has a role of transmission, UE1 sends discovery message and UE2 receives it. UE1 and UE2 can change their transmission and reception role. The transmission from UE1 can be received by one or more UEs like UE2.

Table 1 explains the scenarios in FIG. 1.

TABLE 1

| Scenarios | UE1 | UE2 |
|---|---|---|
| 1A: Out-of-Coverage | Out-of-Coverage | Out-of-Coverage |
| 1B: Partial-Coverage | In-Coverage | Out-of-Coverage |
| 1C: In-Coverage-Single-Cell | In-Coverage | In-Coverage |
| 1D: In-Coverage-Multi-Cell | In-Coverage | In-Coverage |

In 3GPP, RAN1 and RAN2 will focus on a D2D ProSe discovery mechanism for in-coverage (scenarios 1C and 1D).

For discovery, at least the following two types of discovery procedure are defined for the purpose of terminology definition for use in further discussions/studies.

Type 1: a discovery procedure where resources for discovery signal transmission are allocated on a non UE specific basis.

Type 2: a discovery procedure where resources for discovery signal transmission are allocated on a per UE specific basis:

Type 2A: Resources are allocated for each specific transmission instance of discovery signals;

Type 2B: Resources are semi-persistently allocated for discovery signal transmission.

For Type 1 discovery, the following is agreed in 3GPP: periodic uplink resources are allocated for discovery in a semi-static manner; discovery transmission resource configuration consists of a discovery period, number of subframes within a discovery period that can be used for transmission of discovery signals, and for further study number of PRBs (Physical Resource Blocks); for an in-coverage UE, these resources are configured by an eNodeB: allocation can be performed using RRC signaling; resources allocated for discovery within one period of the allocation are TDM and/or FDM into equal sized time-frequency resource blocks that are called "discovery resource"; a discovery resource has a duration of not less than 1 ms and is used for a single transmission of a given discovery MAC (Medium Access Control) PDU (Protocol Data Unit) by a UE; for each discovery period, a UE can transmit on a randomly selected discovery resource.

The eNodeB may provide in SIB (System Information Block): a radio resource pool for discovery transmission and reception in case of Type 1; a radio resource pool for discovery reception of Type 2B.

The basic procedure is: in case of Type 1, a UE autonomously selects radio resources from the indicated Type 1 transmission resource pool for discovery signal transmission; in case of Type 2B, only an "RRC CONNECTED" UE may request resources for transmission of D2D discovery messages from the eNB via RRC, the eNodeB assigns resource via RRC (as baseline, UE releases the transmission resources the latest when the UE enters RRC_IDLE or when the eNB withdraws the resource by RRC signaling; in case of Type 2B as baseline radio resource are allocated by RRC, use of activation/deactivation of radio resources using PDCCH is FFS); receiving UEs monitor both Type 1 and Type 2B discovery resources as authorized.

D2D Communications

Scenarios for D2D ProSe direct communications are same as mentioned above in D2D discovery section. When UE1 has a role of transmission, UE1 sends data and UE2 receives it. UE1 and UE2 can change their transmission and reception role. The transmission from UE1 can be received by one or more UEs like UE2.

Public Safety 1: M D2D broadcast communications should be possible irrespective of availability of infrastructure coverage. It is assumed that 1: M D2D broadcast communications should be supported both on a dedicated carrier and on the same carrier as regular LTE. 1:M D2D broadcast communications are one-way and there is no feedback on Layer 2 (MAC/RLC (Radio Link Control)/PDCP (Packet Data Convergence Protocol)). Discovery is not a required step for groupcast and broadcast communications. For groupcast and broadcast, it is not assumed that all receiving UEs in the group are in proximity of each other. Baseline for broadcast communications is that no closed loop physical layer feedback is to be used.

From a transmitting UE's perspective, a UE can operate in two modes for resource allocation: Mode 1: eNodeB or Release-10 relay node schedules the exact resources used by a UE to transmit direct data and direct control information; Mode 2: a UE on its own selects resources from resource pools to transmit direct data and direct control information.

D2D communications capable UEs shall support at least Mode 1 for in-coverage; D2D communications capable UEs shall support Mode 2 for at least edge-of-coverage and/or out-of-coverage.

For D2D broadcast communications, scheduling assignments (SA) that at least indicate the location of the resource(s) for reception of the associated physical channel that carries D2D data are transmitted by the broadcasting UE. The indication of resource(s) for reception may be implicit and/or explicit based on scheduling assignment resource or content.

For Mode 1, the location of the resources for transmission of the scheduling assignment by the broadcasting UE comes from the eNodeB, and the location of the resource(s) for transmission of the D2D data by the broadcasting UE comes from the eNodeB.

For Mode 2, a resource pool for scheduling assignment is pre-configured and/or semi-persistently allocated.

UE on its own selects the resources for scheduling assignment from the resource pool for scheduling assignment to transmit its scheduling assignment.

When transmitting UEs are out-of-coverage, the resources used for D2D broadcast data are selected from a resource pool. The resource pool can be pre-configured, or semi-statically configured. If the resource pool is semi-statically configured, the method of semi-statically configuring the resource pool is for further study.

UEs in-coverage and out-of-coverage need to be aware of a (time/frequency) resource pool for D2D communication reception. All UEs (Mode 1 ("scheduled") and Mode 2 ("autonomous")) are provided with a (time and frequency) resource pool in which they attempt to receive scheduling assignments.

In Mode 1, a UE requests transmission resources from an eNodeB. The eNodeB schedules transmission resources for transmission of scheduling assignment(s) and data. The UE sends a scheduling request (dedicated scheduling request, D-SR or Random Access, RA) to the eNodeB followed by a BSR (Buffer Status Report) based on which the eNodeB can determine that the UE intends to perform a D2D transmission as well as the required amount of resources.

In Mode 1, the UE needs to be RRC Connected in order to transmit D2D communications. For Mode 2, UEs are provided with a (time and frequency) resource pool from which they choose resources for transmitting D2D communications. The eNodeB controls whether UE may apply Mode 1 or Mode 2 transmission.

For SA, it was agreed that given a certain SA resource pool and time/frequency resource that is used for a first transmission of an SA message by a UE, the other time/frequency resources used by the same UE for the other transmission(s) of the same SA message within an SA resource period should also be known and fixed in the specification.

The SA resource pool configuration was agreed at RAN1 #78. In general, it was defined in time domain and frequency domain respectively. In time domain, a subframe bitmap is used to indicate the SA resources in time (e.g., 1 indicates subframe has SA resources, 0 indicates subframe has no SA resources). In frequency domain, three parameters are used to indicate the SA resources in frequency: length of SA pool in PRBs, the start PRB index of SA pool and the end PRB index of SA pool. It was also agreed that the each SA occupies 1 PRB and transmits 2 times using RV (Redundancy Version) 0 defined in 3GPP TS 36.212.

SUMMARY

Although SA resource pool configuration has been defined, it needs to be further decided how to use the resources in the resource pool. This is a basic functionality to enable D2D communications which should be resolved for both mode 1 and mode 2 communications. There is no concrete proposal agreed in 3GPP. We may set several SA resource patterns, which is used to identify allocated resources within the available resources for transmission of a respective SA. Then it needs to be further decided how to map the physical resources to each SA resource pattern.

One further problem for mode 1 communication is that SA resource index signaled from the network has only 6 bits, i.e. only 64 SA resource patterns can be signaled. However, the total number of SA resource patterns depends on the time and frequency resources allocated for SA, which may sometimes be larger than 64. How to select the 64 SA resource patterns also needs to be standardized.

Therefore, it is an object of the present disclosure to solve at least one of the above-mentioned problems.

According to an aspect of the present disclosure, a method for a user equipment, UE, in device to device, D2D, communications is provided. The method comprises: obtaining parameters indicating available resources for scheduling assignments, SAs; determining SA resource patterns based on the parameters, wherein each SA resource pattern is for communication with a respective UE and refers to distinct allocated resources within the available resources for transmission of a respective SA; and transmitting and/or receiving SAs using corresponding SA resource patterns. According to another aspect of the present disclosure, a method for a network element in device to device, D2D, communications is provided, the method comprises: obtaining parameters indicating available resources for scheduling assignments, SAs; determining SA resource patterns based on the parameters, wherein each SA resource pattern is for communication with a respective user equipment, UE, and refers to distinct allocated resources within the available resources for transmission of a respective SA; and transmitting the parameters to UEs in the D2D communications.

According to a further aspect of the present disclosure, a user equipment, UE, in a device to device, D2D, communications is provided. The UE comprises: a parameters obtaining module adapted for obtaining parameters indicating available resources for scheduling assignments, SAs; a SA resource pattern determining module adapted for determining SA resource patterns based on the parameters, wherein each SA resource pattern is for communication with a respective UE and refers to distinct allocated resources within the available resources for transmission of a respective SA; and an input/output interface adapted for transmitting and/or receiving SAs using corresponding SA resource patterns.

According to a still further aspect of the present disclosure, a network element in device to device, D2D, communications is provided. The network element comprises: a parameters obtaining module adapted for obtaining parameters indicating available resources for scheduling assignments, SAs; a SA resource pattern determining module adapted for determining SA based on the parameters, wherein each SA resource pattern is for communication with a respective UE and refers to distinct allocated resources within the available resources for transmission of a respective SA; and an input/output interface adapted for transmitting the parameters to UEs in the D2D communications.

With the proposed solutions, as each SA resource pattern is for communication with a respective UE and refers to distinct allocated resources within the available resources for transmission of a respective SA, we can achieve orthogonal SA resource partitioning, and thereby limiting the UE decoding complexity.

In above mentioned method, UE or network element, each SA resource pattern refers to two sets of distinct allocated resources within the available resources, and frequency hopping and time hopping are made between the two sets which are used for a first transmission and retransmission of the respective SA respectively. Frequency hopping enables frequency diversity and time hopping maximizes the number of the (semi-)orthogonal resource patterns to address the half duplex constraints.

BRIEF DESCRIPTION OF THE DRAWINGS

The invention will be described in detail by reference to the following drawings, in which.

DETAILED DESCRIPTION

Figure 1:
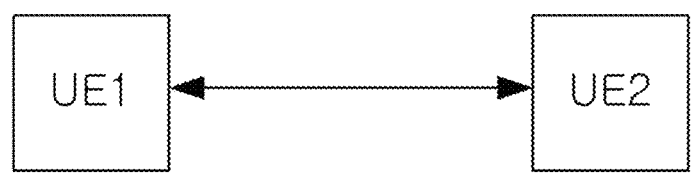
FIGS. 1(a)-(d) show four exemplary scenarios in which two user equipments, UE1 and UE2, are respectively located in-coverage or out-of-coverage of one or more cells.
Figure 1:
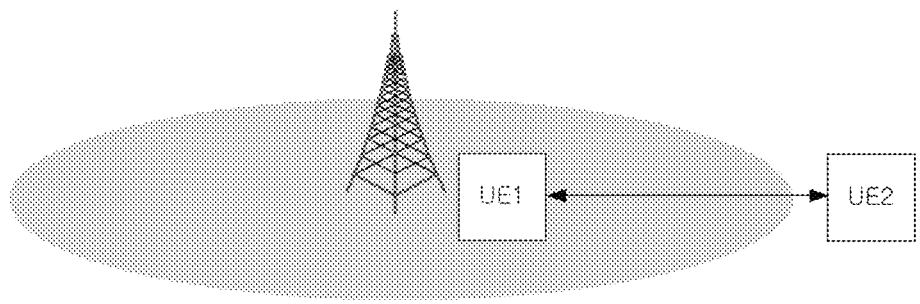
Figure 1:
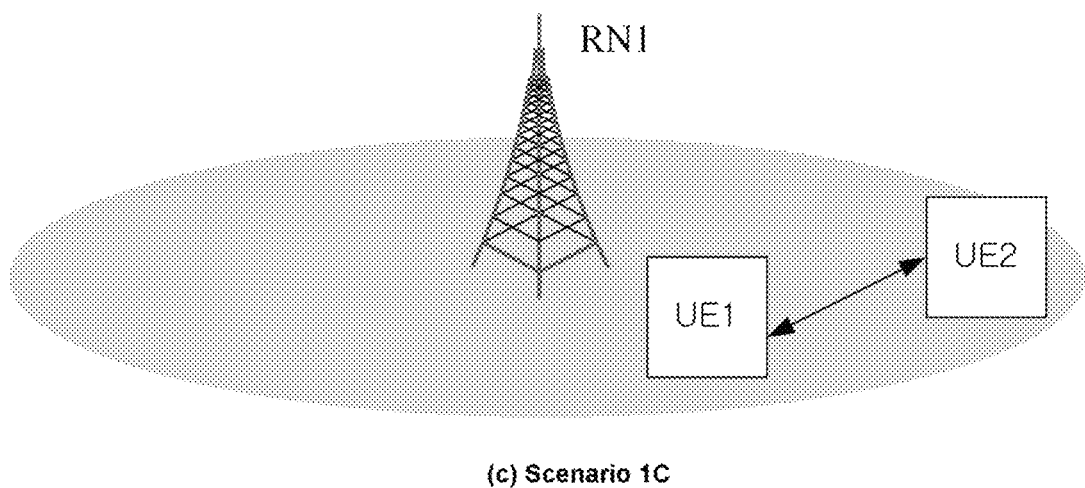
Figure 1:
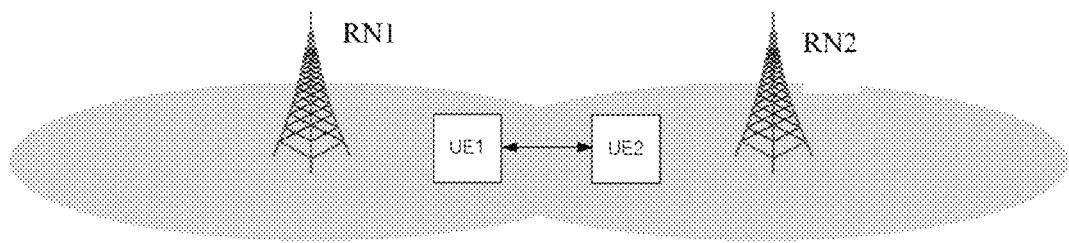

Embodiments of the present disclosure will be described more fully hereinafter with reference to the accompanying drawings, in which embodiments of the disclosure are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present disclosure is described below with reference to block diagrams and/or flowchart illustrations of methods, apparatus (systems) and/or computer program products according to embodiments of the disclosure. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present disclosure may be embodied in hardware and/or in software (including firmware, resident software, micro-code, etc.). Furthermore, the present disclosure may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Although the disclosure is described with reference to the LTE in the context, the skilled in the art should understand that the invention is not limited to this, but can indeed be applied to all existing and future wireless communication networks as appropriate. Although specific terms are used here, such as UE and eNodeB, it should be understood that the invention is not limited to those specific terms but can be applied to all similar entities.

Embodiments of the disclosure will be described below with reference to the drawings.

Each SA may be configured to be transmitted multiple times to address half complex constraints of D2D communications, for example, 2 times, and the first time and second time SA are transmitted using the patterns described in detail in the following embodiments, particularly alternative 1 and alternative 2.

Alternative 1

The SA resource pattern is defined for a given SA resource pool configuration. Details of SA resource pool configuration have already been specified in 3GPP. Since each SA may be configured two transmissions, the time-frequency resources for each SA resource pattern (indicated by numbers 1, 2, 3, . . . 16, but could also be referred to with a logical index 0, 2, 3, . . . 15) in the SA period are determined by two time-frequency resource grid positions.

Mathematically, the first time-frequency resources may be defined as follows:

Time: $n_t\{SA(i)\} = \mod(\mod(i,N_t)+n_{SA},N_t)$;
Frequency: $n_f\{SA(i)\} = \text{floor}(i/N_t)$.

The second time-frequency resources may be defined as follows:

Time: $n_{t\_}\text{next}\{SA(i)\} = \mod(i+1+\mod(n\_RRC+\text{floor}(i/N_t),N_t-1),N_t)$;
Frequency: $n_{f\_}\text{next}\{SA(i)\} = N_f - n_f\{SA(i)\} - 1$.

Notations:

SA(i): the $i^{th}$ SA resource pattern where i is the logical index of SA resource pattern (for example, 0, 1, 2, ... 15);

$n_t\{SA(i)\}$: the time index of the first transmission for SA(i) within one SA period (for example, 0, 1, ... 3);

$n_f\{SA(i)\}$: the frequency index of the first transmission for SA(i) within one SA period (for example, 0, 1, ..., 7);

$n_{t\_}\text{next}\{SA(i)\}$: the time index of the second transmission for SA(i) within one SA period (for example, 0, 1, ... 3);

$n_{f\_}\text{next}\{SA(i)\}$: the frequency index of the second transmission for SA(i) within one SA period (for example, 0, 1, ... 7);

$n_{SA}$: the $n^{th}$ SA period (for example, 0, 1);

$N_t$: the number of subframes configured for SA transmission (for example 4);

$N_f$: the number of PRBs configured for SA transmission (for example 8);

n_RRC: cell-specific offset for collision avoidance among cells (for example 0, 1);

mod(•): modulus operation, modulus after division;

floor(•): round operation, round towards minus infinity.

Figure 2:
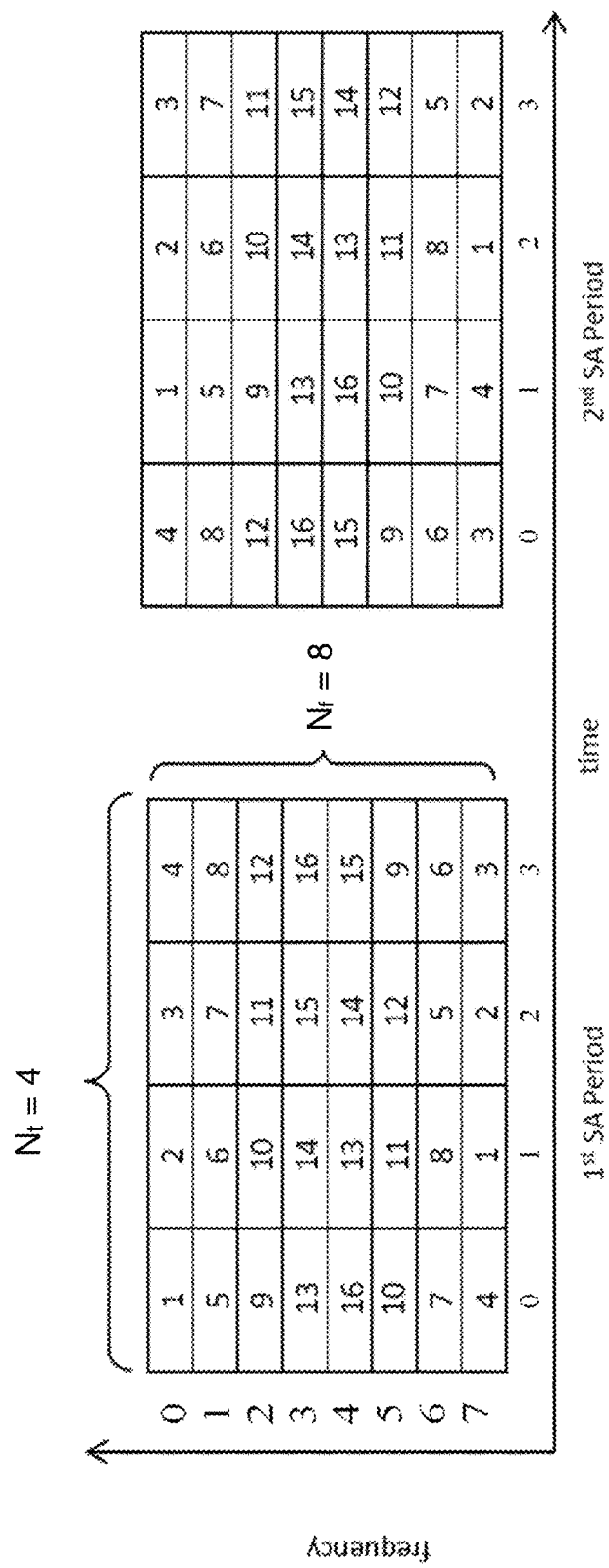
FIG. 2 illustratively shows mapping of scheduling assignment resource patterns to scheduling assignment resource pool in a device to device communication network in accordance to an embodiment of the disclosure.

As an example, one mapping of SA resource patterns to SA resource pool is given in FIG. 2. In this example, number of subframes for the SA resource pool $N_t=4$, number of PRBs for the SA resource pool $N_f=8$, n_RRC=0, $n_{SA}=0,1$. PUCCH (Physical uplink control channel)-like frequency hopping is applied for the two SA transmissions within one SA period.

It is noted that the way to use the resources in the resource pool can ensure allocated resources within the available resources for transmission of a respective SA are distinct, i.e., resources for any two patterns do not overlap.

It will be appreciated from the functions and FIG. 2 that time hopping between the first transmission and retransmission is done by shifting time index as a function of frequency index, for example, for a resource pattern with frequency index of 0, its time index is shifted one step towards a higher value, for a resource pattern with frequency index of 1, its time index is shifted two steps towards a higher value, for a resource pattern with frequency index of 2, its time index is shifted three steps towards a higher value, for a resource pattern with frequency index of 3, its time index is shifted four steps towards a higher value. It will also be appreciated from the functions and FIG. 2 that frequency hopping between the first transmission and retransmission is done by shifting a frequency index to a symmetric frequency index position.

Alternative 2

In this alternative, the time resource allocation follows the rule of alternative 1, the frequency allocation for the SA follows LTE PUSCH (Physical uplink shared channel) type 1 or type 2 resource mapping as is defined in 3GPP 36.213, "Evolved Universal Terrestrial Radio Access (E-UTRA); Physical layer procedures". In the following, we provide an example where the hopping function is applied on the frequency, i.e. PUCCH-like hopping.

Mathematically, the first time-frequency resources may be defined as follows:

Time: $n_t\{SA(i)\} = \mod(\mod(i,N_t)+n_{SA},N_t)$;
Frequency: $n_f\{SA(i)\} = \text{floor}(i/N_t)$.

The second time-frequency resources may be defined as follows:

Time: $n_{t\_}\text{next}\{SA(i)\} = \mod(i+1+(\mod(n\_RRC+\text{floor}(i/N_t),N_t,1),N_t)$;
Frequency: $n_{f\_}\text{next}\{SA(i)\} = n_f\{SA(i)\} + N_f/2$.

Figure 3:
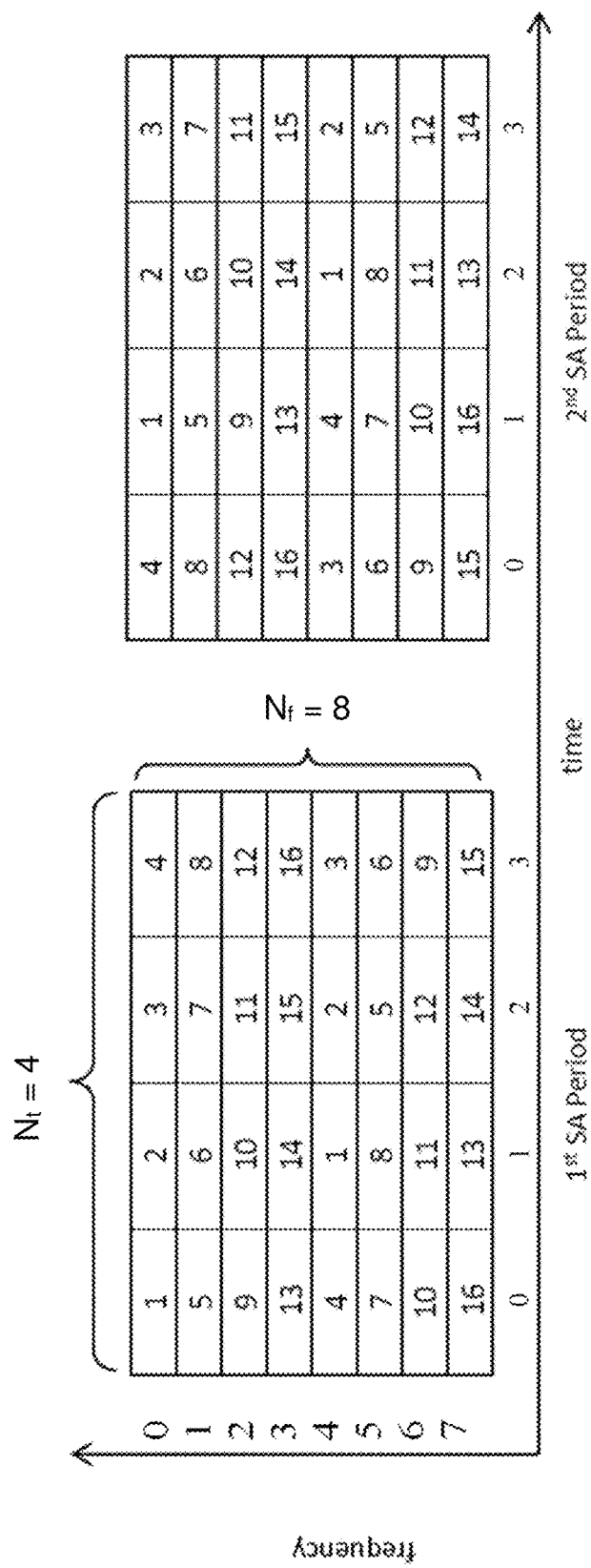
FIG. 3 illustratively shows mapping of scheduling assignment resource patterns to scheduling assignment resource pool in a device to device communication network in accordance to another embodiment of the disclosure.

As an example, another mapping of SA resource patterns to SA resource pool is given in FIG. 3. In this example, number of subframes for the SA resource pool $N_t=4$, number of PRBs for the SA resource pool $N_f=8$, n_RRC=0, $n_{SA}=0,1$.

It is noted that the way to use the resources in the resource pool can ensure allocated resources within the available resources for transmission of a respective SA are distinct, i.e., resources for any two patterns do not overlap.

It will be appreciated from the functions and FIG. 3 that time hopping between the first transmission and retransmission is done by shifting time index as a function of frequency index, for example, for a resource pattern with frequency index of 0, its time index is shifted one step towards a higher value, for a resource pattern with frequency index of 1, its time index is shifted two steps towards a higher value, for a resource pattern with frequency index of 2, its time index is shifted three steps towards a higher value, for a resource pattern with frequency index of 3, its time index is shifted four steps towards a higher value. It will also be appreciated from the functions and FIG. 3 that frequency hopping between the first transmission and retransmission is done by shifting four steps towards a higher value.

A parameter n_RRC results in variations of RA resource pattern configurations in different cells, and such a value, according to general design principles in the art, may be specified by an eNodeB of the cell. Such a parameter would help to avoid constant collisions of inter-cell interference.

It will also be appreciated by one skilled in the art that in case that $N_f$ is an odd number, a floor operation may be applied to $N_f/2$ to make the function feasible.

In mode 1 communications, an eNodeB will decide the SA resource pattern and notifies the UE for D2D communications, using a SA resource index. The SA resource index may be able to indicate the SA resource pattern on its own or may not, depending on total number of SA resource patterns and number of values that a SA resource index can indicate.

The mapping between the SA resource index and the SA resource patterns in mode 1 are given in the following:

If $$N_t * N_f / N_r \leq 2^{N_{SA\_bit}},$$

SA resource index is mapped to the SA resource patterns as defined in alternative 1 and alternative 2. The SA resource index is mapped to one of the SA resource patterns. As an example, The SA resource index is mapped to the SA resource patterns with the same index, i.e. SA resource index 0 is mapped to SA resource pattern of index 0; SA resource index 1 is mapped to SA resource pattern of index 1; etc.

If $$N_t * N_f / N_r > 2^{N_{SA\_bit}},$$

namely number of SA resource patterns is larger than number of values that a SA resource index can indicate, an additional UE-specific parameter n_offset is used to calculate the starting offset of the index of SA resource pattern SA_offset:

$$SA\_offset = 2^{N_{SA\_bit}} \times \mathrm{mod}(n\_offset, \mathrm{ceil}(N_t \times N_f / N_r / 2^{N_{SA\_bit}})).$$

Notations:

$N_r$: the total number of (re)transmissions for each SA (for example 2);

$N_{SA\_bit}$ the number of bits for SA resource index (for example 6 for LTE Release-12 D2D).

Thereby, blocks are formed from the resource patterns shown in FIG. 2 or 3, wherein the number of resource patterns in each block is not larger than the number of values that a SA resource index can indicate.

Figure 4:
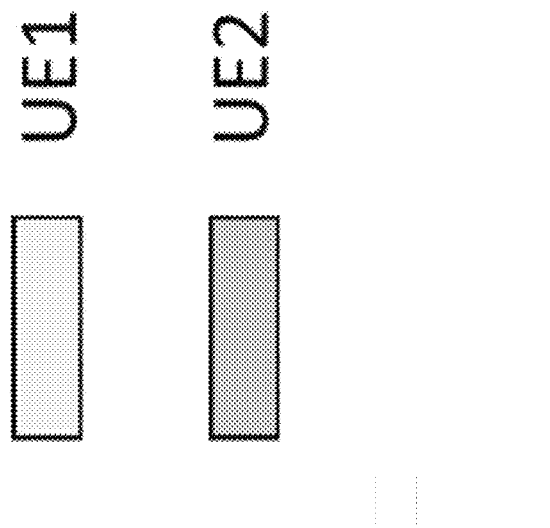
FIG. 4 illustratively shows blocks of scheduling assignment resource patterns that scheduling assignment resource indexes can indicate in a device to device communication network in accordance to an embodiment of the disclosure.

As an example, blocks resulted from the above mapping can be seen in FIG. 4. In this example, number of subframes for SA resource pool $N_t$=4, number of PRBs for SA resource pool $N_f$=8, n_RRC=0, n_offset$_{UE1}$=0, n_offset$_{UE2}$=1. n_offset can be regarded as a block index 0 or 1. Namely the resource pattern can be determined with the block index n_offset and the SA resource pattern index. Therefore, two parameters of block index n_offset and the SA resource index are required to notify the UE of the SA resource pattern. Generally, each block may be used for a respective UE.

Afterwards, control information for data transmission in D2D communications may be transmitted in some type of format on SA according to a SA resource pattern. For mode 1 communications in above example, a UE upon detection of such a format of SA can decode data channel (for example, Physical Sidelink Shared Channel, PSSCH) according to the detected format (For mode 2 communications, a UE upon detection of such a format of SA can decode data channel (for example, PSSCH) according to the detected format, and associated data channel resource configuration configured by higher layers.). It should be noted that in the art transmission on SA is also referred to as transmission of SA or transmitting SA.

Figure 5:
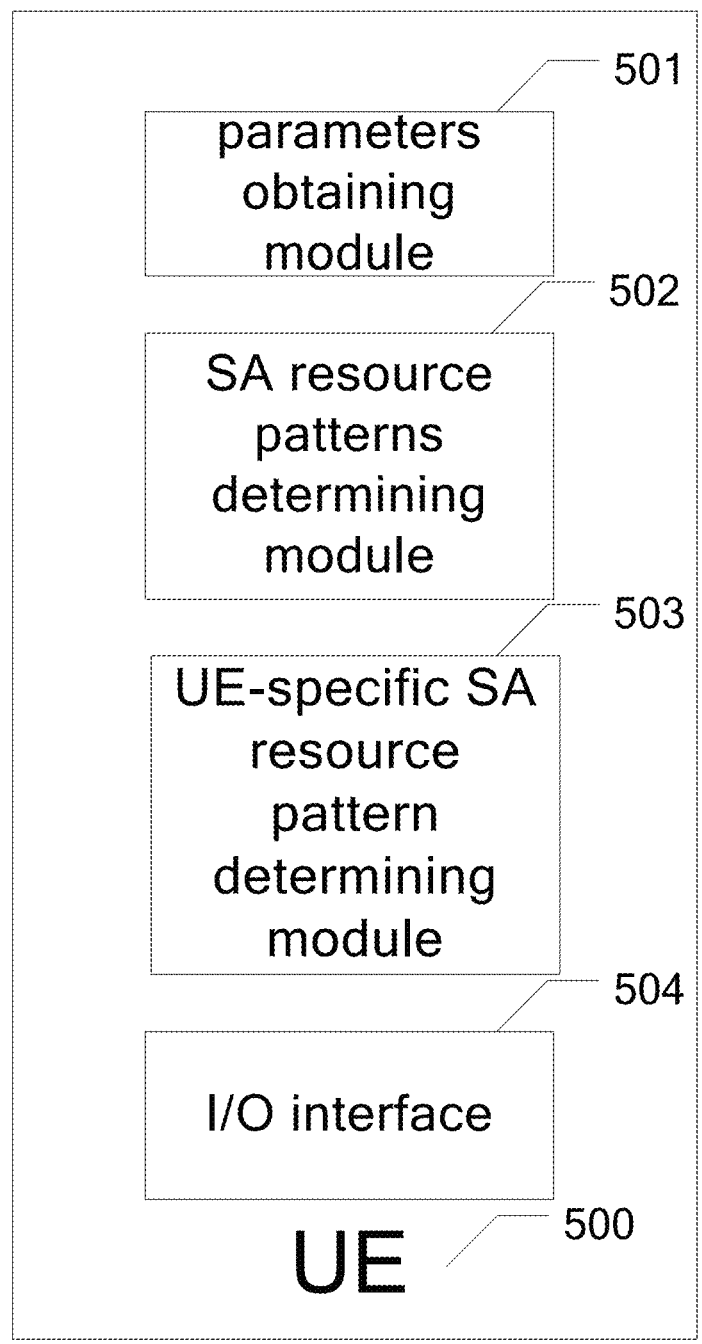
FIG. 5 illustratively shows a block diagram of a user equipment in accordance with an embodiment of the disclosure.

FIG. 5 illustratively shows a block diagram of a user equipment in accordance with an embodiment of the disclosure. As is shown in FIG. 5, a UE 500 in D2D communications, comprises: a parameters obtaining module 501 adapted for obtaining parameters indicating available resources for SAs; a SA resource patterns determining module 502 adapted for determining SA resource patterns based on the parameters, wherein each SA resource pattern is for communication with a respective UE and refers to distinct allocated resources within the available resources for transmission of a respective SA; and an input/output interface 504 adapted for transmitting and/or receiving SAs using corresponding SA resource patterns.

The term "UE" used herein may indicate all forms of devices enabled to communicate via a communication network, such as mobile telephones ("cellular" telephones) and laptops with mobile termination, and thus can be, for example, portable, pocket, hand-held devices, such as mobile phones, smart phones, personal digital assistants (PDA); computer-included devices, such as desktops, laptops; vehicles, or other devices, such as meters, household appliances, medical appliances, multimedia devices, etc., which communicate voice and/or data with radio access network and support D2D communications.

It will be appreciated by one skilled in the art that the parameters obtained herein could be for example, by way of RRC signaling from for example, an eNodeB.

Configuration of each SA resource pattern has been discussed above with reference to FIGS. 2 and 3 and will not be reiterated.

After each SA resource pattern has been determined, in one embodiment in mode 1, the eNodeB may specify one SA resource pattern for a specific UE and notify the UE with a SA resource pattern index, or a SA resource pattern index and a UE-specific parameter, as discussed above with reference to FIG. 4.

Then in such an embodiment, a UE-specific SA resource pattern determining module 503 comprised in the UE 500 will determine the SA resource pattern, based on the received SA resource pattern index, or the SA resource pattern index and the UE-specific parameter, for itself to transmit and/or receive the SA. Each SA resource pattern refers to two sets of distinct allocated resources within the available resources, and frequency hopping and time hopping are made between the two sets which are used for a first transmission and retransmission of the respective SA respectively, as is discussed with reference to FIGS. 2 and 3 above.

Figure 6:
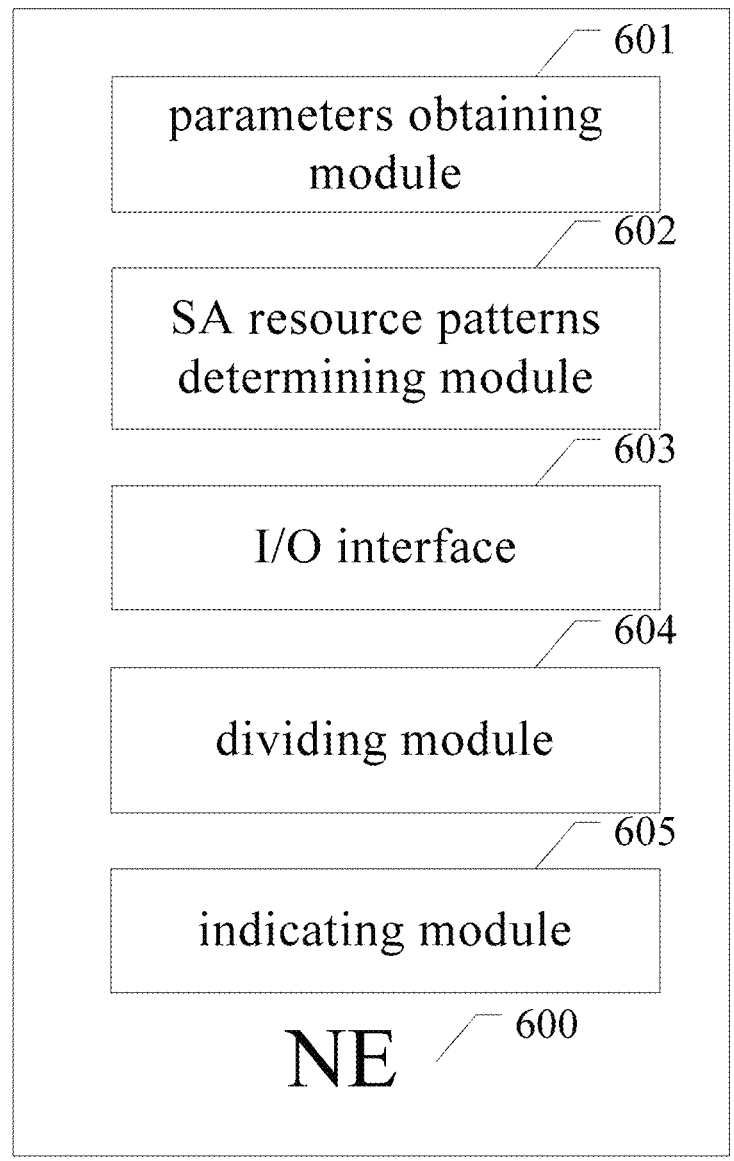
FIG. 6 illustratively shows a block diagram of a network element in accordance to another embodiment of the disclosure.

FIG. 6 illustratively shows a block diagram of a network element 600 in accordance to another embodiment of the disclosure. As is shown in FIG. 6, network element 600 in D2D communications comprises a parameters obtaining module 601 adapted for obtaining parameters indicating available resources for SAs; a SA resource patterns determining module 602 adapted for determining SA resource patterns based on the parameters, wherein each SA resource pattern is for communication with a respective UE and refers to distinct allocated resources within the available resources for transmission of a respective SA; and an input/output interface 603 adapted for transmitting the parameters to UEs in the D2D communication.

The network element is generally a radio base station, sometimes also referred to in the art as a macro base station, a node B, or B-node, an eNodeB (eNB), and is sometimes also referred to in the art as a micro/femto/pico base stations, a micro/femto/pico node B, or micro/femto/pico B-node, a micro/femto/pico eNodeB (eNB). Besides, the network element could also be any other device in the wireless network, such as a WLAN access point, that could enable similar contributions to the D2D communications herein as an eNodeB does.

Configuration of each SA resource pattern has been discussed above with reference to FIGS. 2 and 3 and will not be reiterated.

In one embodiment, as discussed above with reference to FIG. 4, a SA resource pattern index, or a SA resource pattern index and a UE-specific parameter may be needed to notify the UE by the network element of its SA resource pattern. Then in such an embodiment, in one example, the network element further comprises a dividing module adapted for dividing the SA resource patterns into several groups in response to determining number of the SA resource patterns is larger than number of values that a SA resource index can indicate, wherein the number of SA resource patterns in each group is no more than the number of values that a SA resource index can indicate; an indicating module adapted for indicating each resource pattern with an index of the group and the SA resource index; and the input/output interface is further configured for transmitting the index of the group and the SA resource index to a UE.

In another example, the network element further comprises an indicating module adapted for indicating each resource pattern with a SA resource index in response to determining number of resource patterns is not larger than number of values that the SA resource index can indicate; and the input/output interface is further configured for transmitting the SA resource index to a UE.

Figure 7:
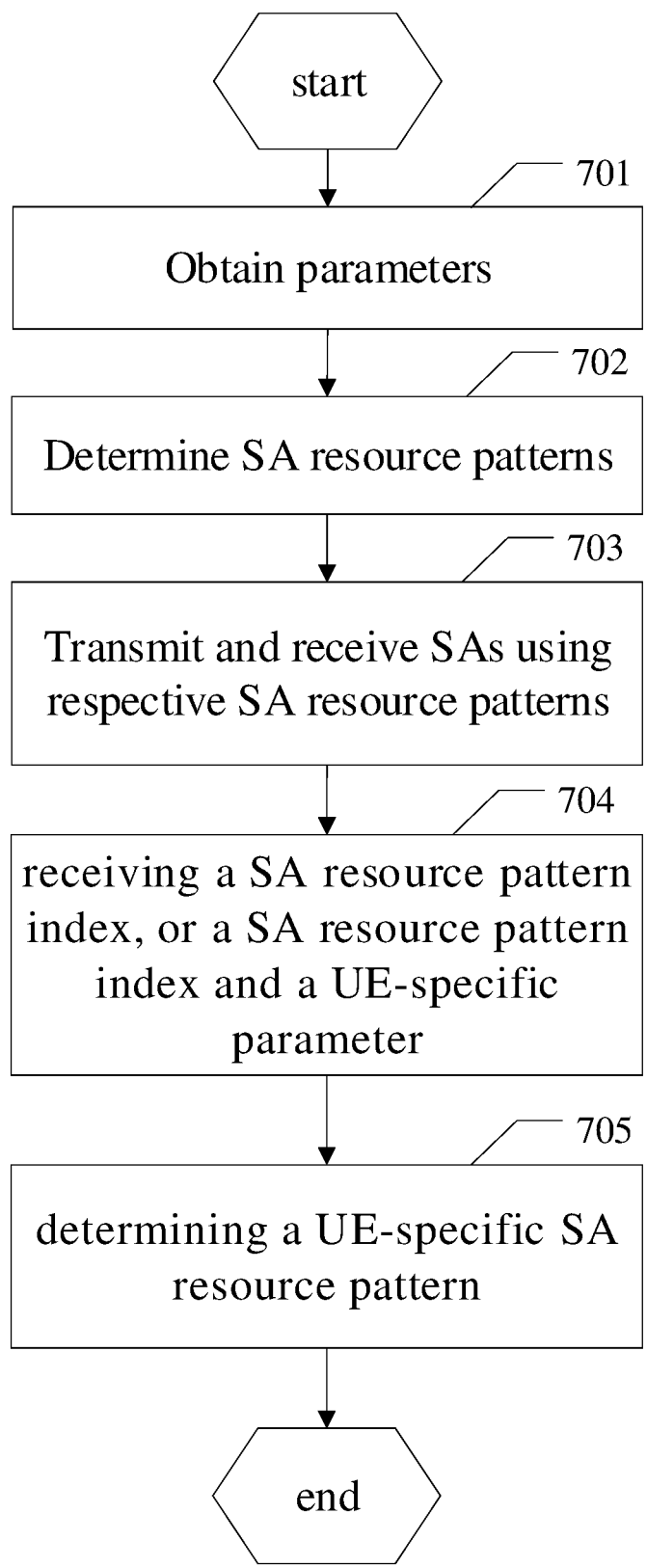
FIG. 7 illustratively shows a flow chart in accordance to an embodiment of the disclosure.

FIG. 7 illustratively shows a flow chart in accordance to an embodiment of the disclosure. As is shown in FIG. 7, a method of mapping SA resource indexes between scheduling assignment patterns in D2D communications comprises: obtaining parameters indicating available resources for SAs at step 701; determining SA resource patterns based on the parameters at step 702, wherein each SA resource pattern is for communication with a respective UE and refers to distinct allocated resources within the available resources for transmission of a respective SA; and transmitting and/or receiving SAs using corresponding SA resource patterns at step 703.

Configuration of each SA resource pattern has been discussed above with reference to FIGS. 2 and 3 and will not be reiterated.

After each SA resource pattern has been determined, in one embodiment in mode 1, the eNodeB may specify one SA resource pattern for a specific UE and notify the UE with a SA resource pattern index, or a SA resource pattern index and a UE-specific parameter, as discussed above with reference to FIG. 4.

Then in such an embodiment, the method further comprises receiving a SA resource pattern index, or a SA resource pattern index and a UE-specific parameter at step 704; and determining a UE-specific SA resource pattern, based on the SA resource pattern index, or the SA resource pattern index and the UE-specific parameter, for the specific UE to transmit and/or receive the SA at step 705.

It is noted that order of the steps are just illustrative rather than limiting. It will be appreciated by one skilled in the art that step 703 may be done before step 705, for example mode 2 communications are done first, or after step 705, for example mode 1 communications are done first, other scenarios may also be appreciated.

Figure 8:
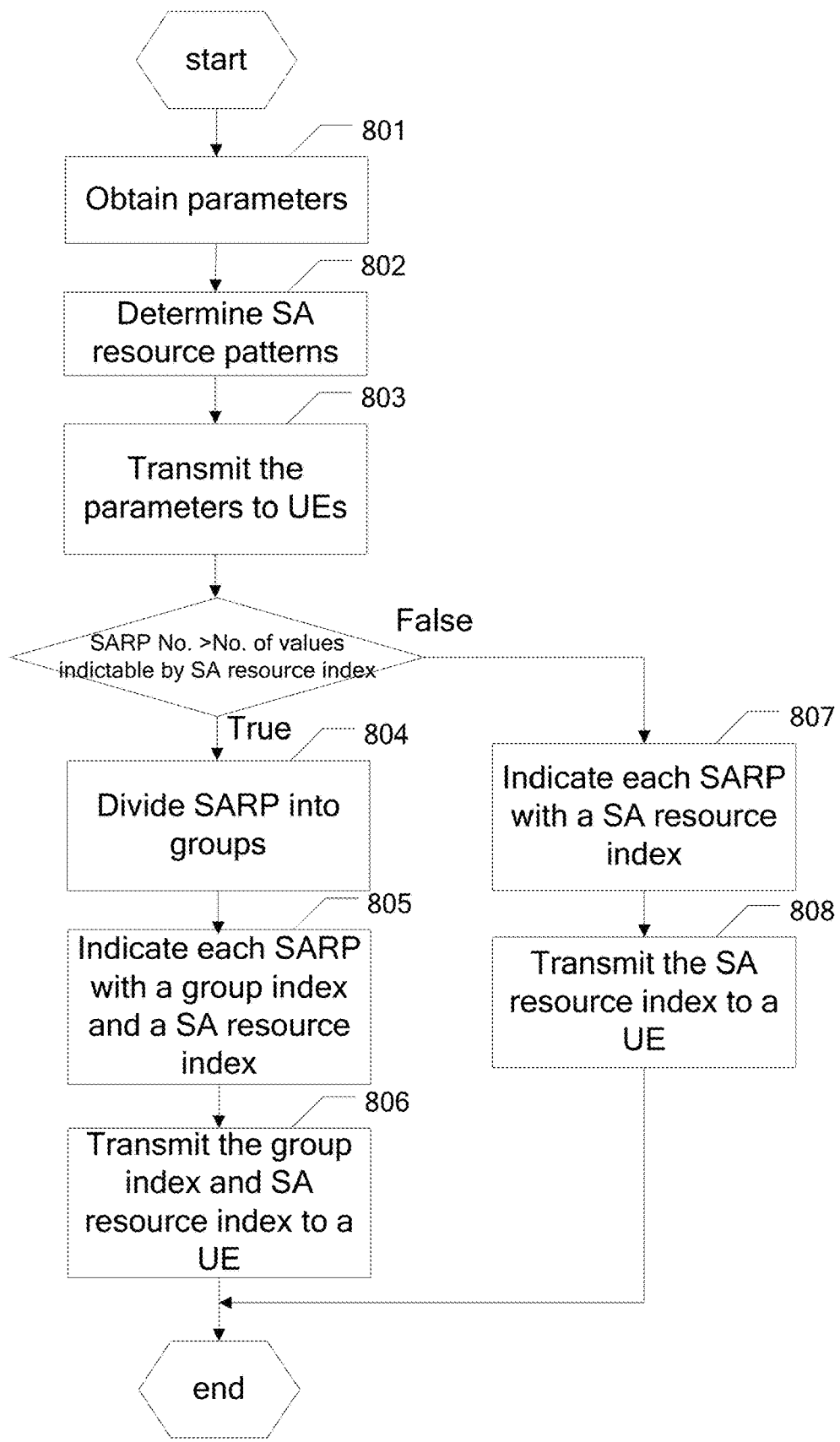
FIG. 8 illustratively shows a flow chart in accordance to another embodiment of the disclosure.

FIG. 8 illustratively shows a flow chart for a network element in D2D communications in accordance with an embodiment of the disclosure. As is shown in FIG. 8, the network element comprises: obtaining parameters indicating available resources for SAs at step 801; determining SA resource patterns based on the parameters at step 802, wherein each SA resource pattern is for communication with a respective user equipment, UE, and refers to distinct allocated resources within the available resources for transmission of a respective SA; and transmitting the parameters to UEs in the D2D communications at step 803.

Configuration of each SA resource pattern has been discussed above with reference to FIGS. 2 and 3 and will not be reiterated.

In one embodiment, as discussed above with reference to FIG. 4, a SA resource pattern index, or a SA resource pattern index and a UE-specific parameter may be needed to notify the UE by the network element of its SA resource pattern. Then in such an embodiment, in one example, the method further comprises: at step 804, in response to determining number of the SA resource patterns is larger than number of values that a SA resource index can indicate, dividing the SA resource patterns into several groups, wherein the number of SA resource patterns in each group is no more than the number of values that a SA resource index can indicate; at step 805 indicating each SA resource pattern with an index of the group and the SA resource index; and at step 806, transmitting the index of the group and the SA resource index to a UE.

In another example, the method further comprises: in response to determining number of resource patterns is not larger than number of values that a SA resource index can indicate, indicating each resource pattern with the SA resource index at step 807; and transmitting the SA resource index to a UE at step 808.

While the exemplary embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention is not be limited to the particular embodiment disclosed as the best mode contemplated for carrying out the present invention, but that the present invention include all embodiments falling within the scope of the appended claims.

What is claimed is:

1. A method for a user equipment (UE) in device to device (D2D) communications, comprising:
obtaining parameters indicating available resources for scheduling assignments (SAs), wherein:
the available resources are arranged into a plurality of distinct resources and a plurality of SA resource patterns;
each of the distinct resources can be allocated for one or more SAs related to a single UE;
each SA resource pattern is related to one or more of the distinct resources; and
transmitting and/or receiving SAs using particular distinct resources autonomously selected from the available resources according to a particular SA resource pattern and a parameter specific to a cell serving the UE.

2. The method of claim 1, wherein each SA resource pattern is associated with first distinct resources usable for an initial transmission of a scheduling assignment and with second distinct resources usable for a retransmission of the scheduling assignment, wherein the first and second distinct resources differ in time and in frequency.

3. The method of claim 1, wherein:
the available resources are arranged in a time-frequency grid; and
the time locations of the particular distinct resources, within the time-frequency grid, are related to the parameter specific to the cell serving the UE.

4. The method of claim 1, further comprising:
receiving a SA resource pattern index; and
determining the particular SA resource pattern based on the SA resource pattern index.

5. The method of claim 4, further comprising:
receiving a UE-specific parameter; and
autonomously selecting the particular distinct resources based on the SA resource pattern, the cell-specific parameter, and the UE-specific parameter.

6. A method for a network element in device to device (D2D) communications, comprising:
transmitting parameters indicating available resources for scheduling assignments (SAs) to one or more UEs;

determining a plurality of SA resource patterns based on the parameters, wherein each SA resource pattern is associated with distinct resources, within the available resources, that can be allocated for one or more SAs related to a single user equipment (UE);

determining if the number of SA resource patterns comprising the plurality is greater than the number of SA resource patterns identifiable by an SA resource index; and transmitting, to a particular UE, information identifying a particular one of the plurality of SA resource patterns, wherein the information comprises:
the SA resource index; and
if it is determined that the number of SA resource patterns comprising the plurality is greater than the number of SA resource patterns identifiable by the SA resource index, a second index identifying a SA resource group to which the particular SA resource pattern belongs.

7. A user equipment (UE) in a device to device (D2D) communications, comprising:
an input/output interface circuit configured to communicate with one or more UEs in D2D communications; and
a processing circuit configured to:
obtain parameters indicating available resources for scheduling assignments (SAs), wherein:
the available resources are arranged into a plurality of distinct resources and a plurality of SA resource patterns;
each of the distinct resources can be allocated for one or more SAs related to a single UE;
each SA resource pattern is related to one or more of the distinct resources; and
transmit and/or receive SAs, via the input/output interface circuit, using particular distinct resources autonomously selected from the available resources according to a particular SA resource pattern and a parameter specific to a cell serving the UE.

8. The UE of claim 7, wherein each SA resource pattern is associated with first distinct resources usable for an initial transmission of a scheduling assignment and with second distinct resources usable for a retransmission of the scheduling assignment, wherein the first and second distinct resources differ in time and in frequency.

9. The UE of claim 7, wherein:
the available resources are arranged in a time-frequency grid; and
the time locations of the particular distinct resources, within the time-frequency grid, are related to the parameter specific to the cell serving the UE.

10. The UE of claim 7, wherein the processing circuit is further configured to:
receive an SA resource pattern index via the input/output interface circuit; and
determine the particular SA resource pattern based on the SA resource pattern index.

11. The UE of claim 10, wherein the processing circuit is further configured to:
receive a UE-specific parameter via the input/output interface circuit; and
autonomously select the particular distinct resources based on the SA resource pattern, the cell-specific parameter, and the UE-specific parameter.

12. A network element in device to device (D2D) communications, comprising:
an input/output interface circuit configured to communicate with one or more user equipment (UEs); and
a processing circuit configured to:
transmit parameters indicating available resources for scheduling assignments (SAs) to one or more UEs;
determine a plurality of SA resource patterns based on the parameters, wherein each SA resource pattern is associated with distinct resources, within the available resources, that can be allocated for one or more SAs related to a single user equipment (UE); and
transmit, to a particular UE, information identifying a particular one of the plurality of SA resource patterns, wherein the information comprises:
a SA resource index; and
if the number of SA resource patterns comprising the plurality is greater than the number of SA resource patterns identifiable by the SA resource index, a second index identifying a SA resource group to which the particular SA resource pattern belongs.

* * * * *